US012021334B2

(12) United States Patent
Chou et al.

(10) Patent No.: US 12,021,334 B2
(45) Date of Patent: Jun. 25, 2024

(54) CIGARETTE LIGHTER PLUG OF AUTOMOBILE TIRE REPAIRING DEVICE

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

( * ) Notice: Subject to any disclaimer, the term of this patent is extended or adjusted under 35 U.S.C. 154(b) by 595 days.

(21) Appl. No.: 17/322,775

(22) Filed: May 17, 2021

(65) Prior Publication Data

US 2022/0118955 A1    Apr. 21, 2022

(30) Foreign Application Priority Data

May 13, 2020    (TW) .................................. 109115933

(51) Int. Cl.
*H01R 24/58*    (2011.01)
*H01R 13/58*    (2006.01)
*H01R 24/28*    (2011.01)

(52) U.S. Cl.
CPC ......... *H01R 24/58* (2013.01); *H01R 13/5833* (2013.01); *H01R 24/28* (2013.01)

(58) Field of Classification Search
None
See application file for complete search history.

(56) References Cited

U.S. PATENT DOCUMENTS

2015/0035667 A1    2/2015   Li

FOREIGN PATENT DOCUMENTS

| CN | 208028250 | 10/2018 |
|---|---|---|
| JP | S6092477 | 6/1985 |
| JP | S63502231 | 8/1988 |
| JP | H04501481 | 3/1992 |
| JP | 3022442 | 3/1996 |
| JP | 2010017857 | 1/2010 |
| JP | 2021001758 | 1/2021 |

OTHER PUBLICATIONS

"Office Action of Japan Counterpart Application", issued on Nov. 15, 2022, p. 1-p. 2.

*Primary Examiner* — Ross N Gushi
(74) *Attorney, Agent, or Firm* — JCIPRNET

(57) ABSTRACT

A cigarette lighter plug of an automobile tire repairing device, the tire repairing device contains: a box for receiving an air pump. The cigarette lighter plug is inserted into a power supply. The cigarette lighter plug includes a first housing, a second housing, and a power cord. The power cord includes a positive-electrode power part and a negative-electrode power part, the second housing includes a post, a first accommodation chamber, a column, a second accommodation chamber, a semi-arch flexible element. The second housing further includes a wing, a third accommodation chamber defined between the wing and the column, and a fourth accommodation chamber defined between a conductive foot of the semi-arch flexible element and the column so as to receive the power cord. The first housing is engaged with the second housing, and the power cord is not winded or is bent in an S shape.

8 Claims, 14 Drawing Sheets

CIGARETTE LIGHTER PLUG OF AUTOMOBILE TIRE REPAIRING DEVICE

FIELD OF THE INVENTION

The present invention relates to a cigarette lighter plug of an automobile tire repairing device which is inserted into a socket of a vehicle and is in a small size so as to be stored in a receiving groove of a box of an air compressor of the tire repairing device.

BACKGROUND OF THE INVENTION

Electrical appliances (such as mobile phones, driving recorders, satellite navigation) are used in the car, wherein a cigarette lighter plug is configured to be inserted into a socket of a cigarette lighter of a car and is applicable for an automobile tire repairing device.

However, a power cord includes a positive-electrode power part and a negative-electrode power part which is separated from the positive-electrode power part by working, and the positive-electrode power part is welded with a positive conductive portion, the negative-electrode power part is welded with a negative conductive portion. Since the positive conductive portion and the negative conductive portion are arranged on the cigarette lighter plug at different positions, one of the positive-electrode power part and the negative-electrode power part is cut or is winded in a short length to cause troublesome fabrication.

Furthermore, the cigarette lighter plug is pulled by pulling the positive-electrode power part and the negative-electrode power part, thus a removal, poor contact, and a short circuit.

The present invention has arisen to mitigate and/or obviate the afore-described disadvantages.

SUMMARY OF THE INVENTION

The primary aspect of the present invention is to provide a cigarette lighter plug of an automobile tire repairing device which is in a small size so as to be stored in a receiving groove of a box of an air compressor of the tire repairing device easily.

Further aspect of the present invention is to provide a cigarette lighter plug of an automobile tire repairing device which contains a pull ring by which when the cigarette lighter plug is inserted a the socket of a vehicle, a first bend section and a second bend section of the pull ring are abutted against by an external fence of the socket so that the pull ring rotates at an angle; when the cigarette lighter plug is removed from the socket, it urges the pull ring to be moved outward, the two locking orifices of the first housing are engaged with the two lock tabs of the second housing, and the first retainer of the first housing is retained with the second retainer so that the cigarette lighter plug is removed from the socket, the first housing and the second housing are not forced to damage.

Another aspect of the present invention is to provide a cigarette lighter plug of an automobile tire repairing device which contains a power cord including a positive-electrode power part and a negative-electrode power part, and a positive-electrode power part and a negative-electrode power part are not winded or are bent in an S shape to avoid being pulled to cause a removal or a poor contact of the positive-electrode power cord and the negative-electrode power cord, thus preventing a short circuit.

DETAILED DESCRIPTION OF THE PREFERRED EMBODIMENTS

Figure 10:
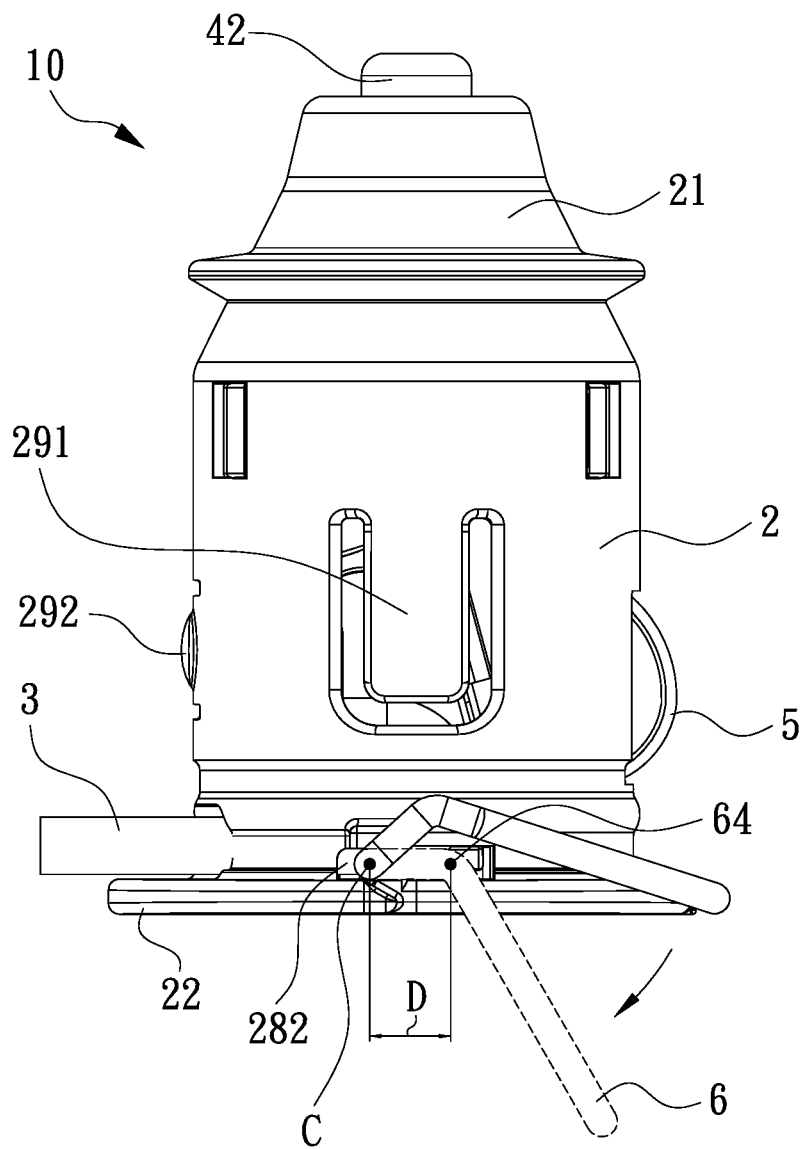
FIG. 10 is a side plan view showing the assembly of the cigarette lighter plug of the automobile tire repairing device according to the preferred embodiment of the present invention.
Figure 11:
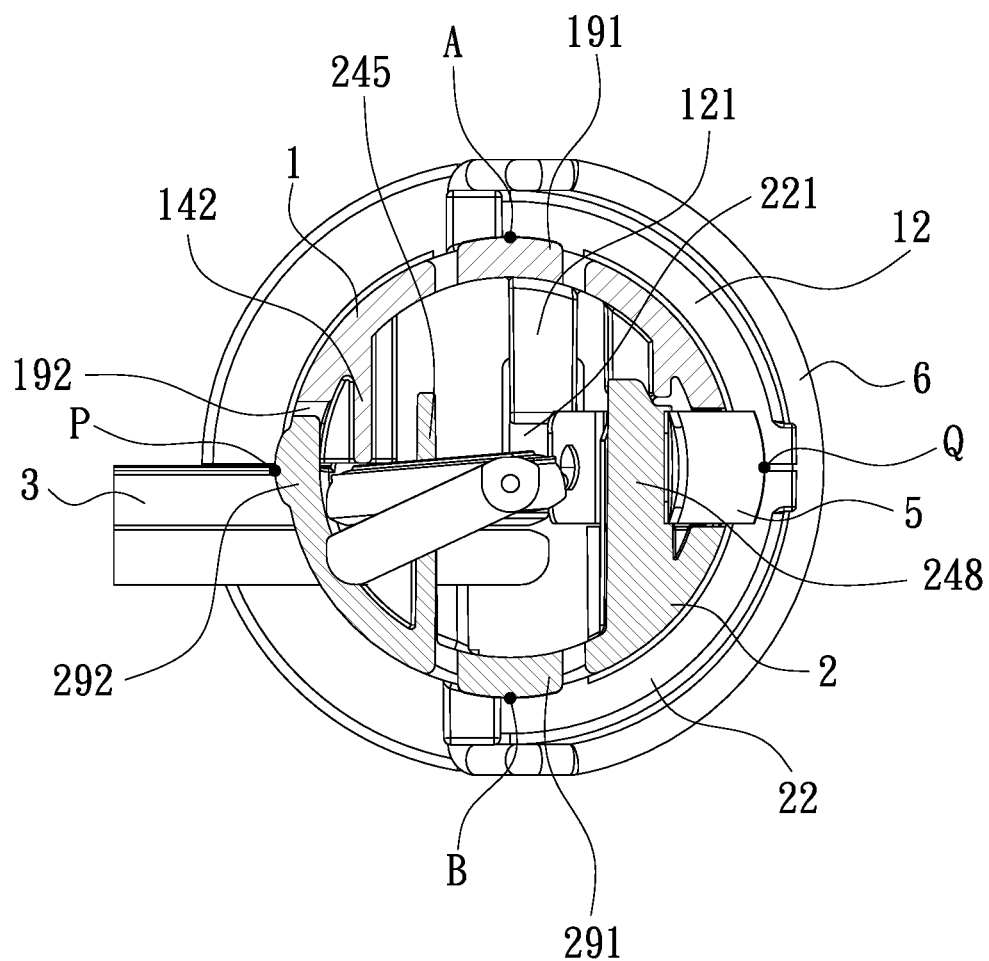
FIG. 11 is a cross sectional view showing the assembly of the cigarette lighter plug of the automobile tire repairing device according to the preferred embodiment of the present invention.
Figure 12:
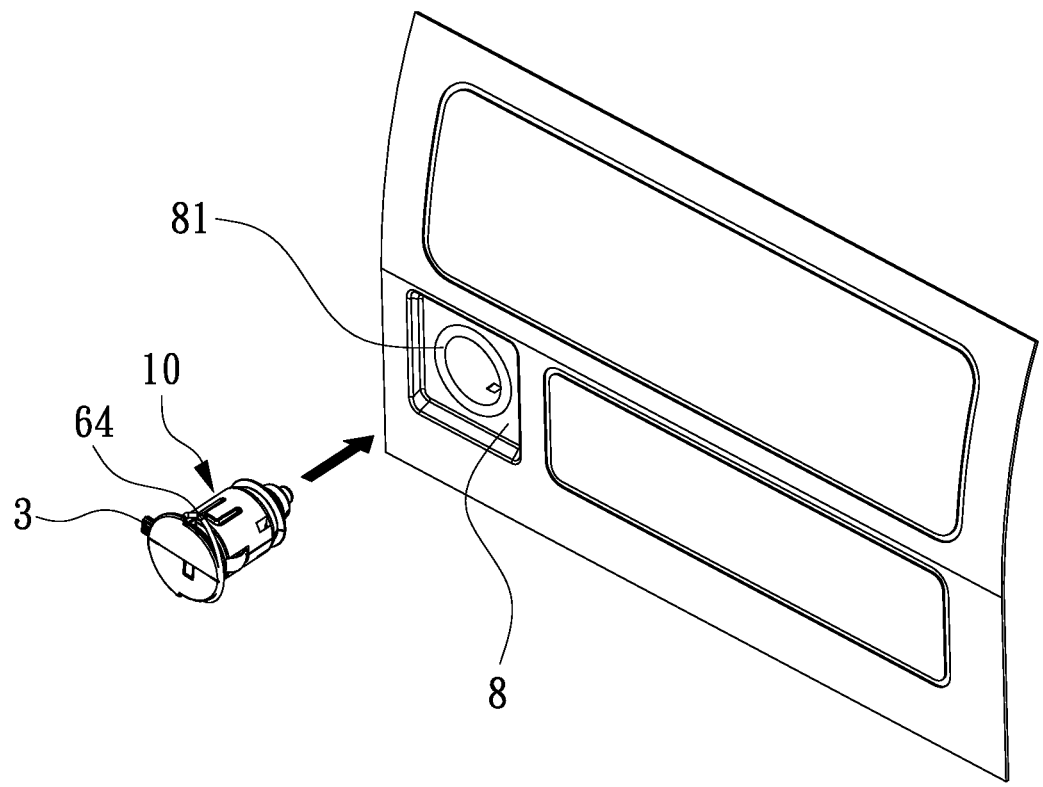
FIG. 12 is a perspective view showing the application of the cigarette lighter plug of the automobile tire repairing device according to the preferred embodiment of the present invention.

With reference to FIGS. 1-11, a cigarette lighter plug 10 of an automobile tire repairing device according to a preferred embodiment of the present invention is in a small size so as to be stored in a receiving groove 70 of a box 7 of an air compressor of the tire repairing device. The tire repairing device includes an air pump 71 received in the box 70, and a sealant supply can 72 connected with the air pump 71. The cigarette lighter plug 10 is inserted into a power supply so as to receive electricity, wherein the power supply is a socket 8 of a vehicle, as shown in FIG. 12. The cigarette lighter plug 10 includes a first housing 1, a second housing 2, and a power cord 3.

The first housing 1 is semi-cylindrical and includes a first extension 11 and an end seat 12. The first extension 11 has a first semicircular orifice 110 defined thereon, and the end seat 12 has a first retainer 121. The first housing 1 includes two locking orifices 13 formed on an inner wall thereof adjacent to the first extension 11, multiple first partitions formed on the inner wall of the first housing 1, and at least one positioning orifice 15 formed on the inner wall of the first housing 1. The multiple first partitions have a first contact sheet 141 and a second contact sheet 142, the first housing 1 includes a first cutout 16 adjacent to the end seat 12, and the first housing 1 further includes a first notch 17 connected with the end seat 12.

The second housing 2 is semi-cylindrical and includes a second extension 21 and a holder 22. The second extension 21 has a second semicircular orifice 210 defined thereon and corresponding to the first semicircular orifice 110 of the first housing 1, and the holder 22 has a second retainer 221. The second housing 2 includes two lock tabs 23 extending from an inner wall thereof and corresponding to the two locking orifices 13 of the first housing 1, multiple second partitions formed on the inner wall of the second housing 2, at least one bolt 25 corresponding to the at least one positioning orifice 15 of the first housing 1. The multiple second partitions have a first L-shaped sheet 241, a second L-shaped sheet 242, an arched sheet 243, a first support sheet 244, a column 245, a second support sheet 246, a post 247, a third L-shaped sheet 248, and an extending sheet 249. The first L-shaped sheet 241 is spaced from the second L-shaped sheet 242 oppositely, the two lock tabs 23 are connected with two short segments of the first L-shaped sheet 241 and the second L-shaped sheet 242, and the second semicircular orifice 210 is connected with two long segments of the first L-shaped sheet 241 and the second L-shaped sheet 242, wherein the arched sheet 243 is defined between the first L-shaped sheet 241 and the second L-shaped sheet 242, the first support sheet 244 extends from the inner wall of the second housing 2 and is defined between the first L-shaped sheet 241 and the holder 22 of the second housing 2, the column 245 extends upward from the first support sheet 244 proximate to a center of the second housing 2, and the second support sheet 246 is formed on the inner wall of the second housing 2 and is defined between the first support sheet 244 and the holder 22 of the second housing 2. The post 247 extends upward between the second support sheet 246 and the holder 22 of the second housing 2, a first accommodation chamber 91 is defined between the holder 22 of the second housing 2 and the post 247, and a second accommodation chamber 92 is defined between the column 245 and the post 247. The third L-shaped sheet 248 extends from the inner wall of the second housing 2 opposite to the first support sheet 244, and the extending sheet 249 extends upward from the third L-shaped sheet 248 and the holder 22 of the second housing 2. The second housing 2 further includes a second cutout 26 defined adjacent to the holder 22, and a wing 292 extends from the second housing 2 opposite to the first cutout 26. A third accommodation chamber 93 is defined between the wing 292 and the column 245, and a fourth accommodation chamber 94 is defined between the third L-shaped sheet 248 and the column 245, wherein the second housing 2 includes a second notch 27 connected with the holder 22 and defined between the post 247 and the holder 22 of the second housing 2.

The power cord 3 includes a positive-electrode power part 31 and a negative-electrode power part 32 which have a same length so as to be worked easily. The power cord 3 is received in the first accommodation chamber 91, the second accommodation chamber 92, the third accommodation chamber 93, and the fourth accommodation chamber 94 among the multiple second partitions of the second housing 2, wherein the power cord 3 is fixed on the second support sheet 246 from the second notch 27 of the second housing 2 via the first accommodation chamber 91, and the power cord 3 is further inserted through the second accommodation chamber 92 and the third accommodation chamber 93 to be positioned on the first support sheet 244, then the power cord 3 is inserted into the fourth accommodation chamber 94 from the first support sheet 244, wherein the power cord 3 includes the positive-electrode power part 31 and the negative-electrode power part 32 which are not winded or are bent in an S shape to avoid being pulled to cause a removal or a poor contact of the positive-electrode power cord and the negative-electrode power cord, thus preventing a short circuit. In addition, the positive-electrode power part 31 and the negative-electrode power part 32 are not winded or are bent in the S shape, so they are pulled forcefully. The positive-electrode power part 31 has a positive-electrode pin 311, and the negative-electrode power part 32 has a negative-electrode pin 321.

A positive-electrode conductive stem 4 includes an intermediate section and two external segments, wherein a diameter of the intermediate section is less than a diameter of the two external segments. The positive-electrode conductive stem 4 includes a fixing foot 41 extending from a first end thereof, a head 42 formed on a second end of the positive-electrode conductive stem 4, a spring 43 fitted onto the positive-electrode conductive stem 4 from the fixing foot 41 and abuts against the spring 43. The positive-electrode pin 311 of the positive-electrode power part 31 contacts with the fixing foot 41 of the positive-electrode conductive stem 4, the positive-electrode conductive stem 4 is received between the first L-shaped sheet 241 and the second L-shaped sheet 242 of the second housing 2 and is mounted on the arched sheet 243, wherein the positive-electrode power part 31 is accommodated in the multiple second partitions of the second housing 2.

A semi-arch flexible element 5 is made of conductive material, the semi-arch flexible element 5 includes a flank 51 extending from a first end thereof, a L-shaped sheet 52 extending from a second end of the semi-arch flexible element 5, and a conductive foot 53 extending from a distal end of the L-shaped sheet 52, wherein the L-shaped sheet 52 of the semi-arch flexible element 5 is retained between the third L-shaped sheet 248 and the extending sheet 249 of the second housing 2, and the flank 51 of the semi-arch flexible element 5 abuts against the fourth accommodation chamber 94, wherein the negative-electrode pin 321 of the negative-electrode power part 32 of the power cord 3 is connected with the conductive foot 53 of the semi-arch flexible element 5, the negative-electrode power part 32 of the power cord 3 is received among the multiple second partitions, wherein the positive-electrode power part 31 is welded with the positive-electrode conductive stem 4, and the negative-electrode power part 32 is welded with the conductive foot 53 of the semi-arch flexible element 5, wherein a length of the positive-electrode power part 31 is equal to a length of the negative-electrode power part 32.

Figure 4:
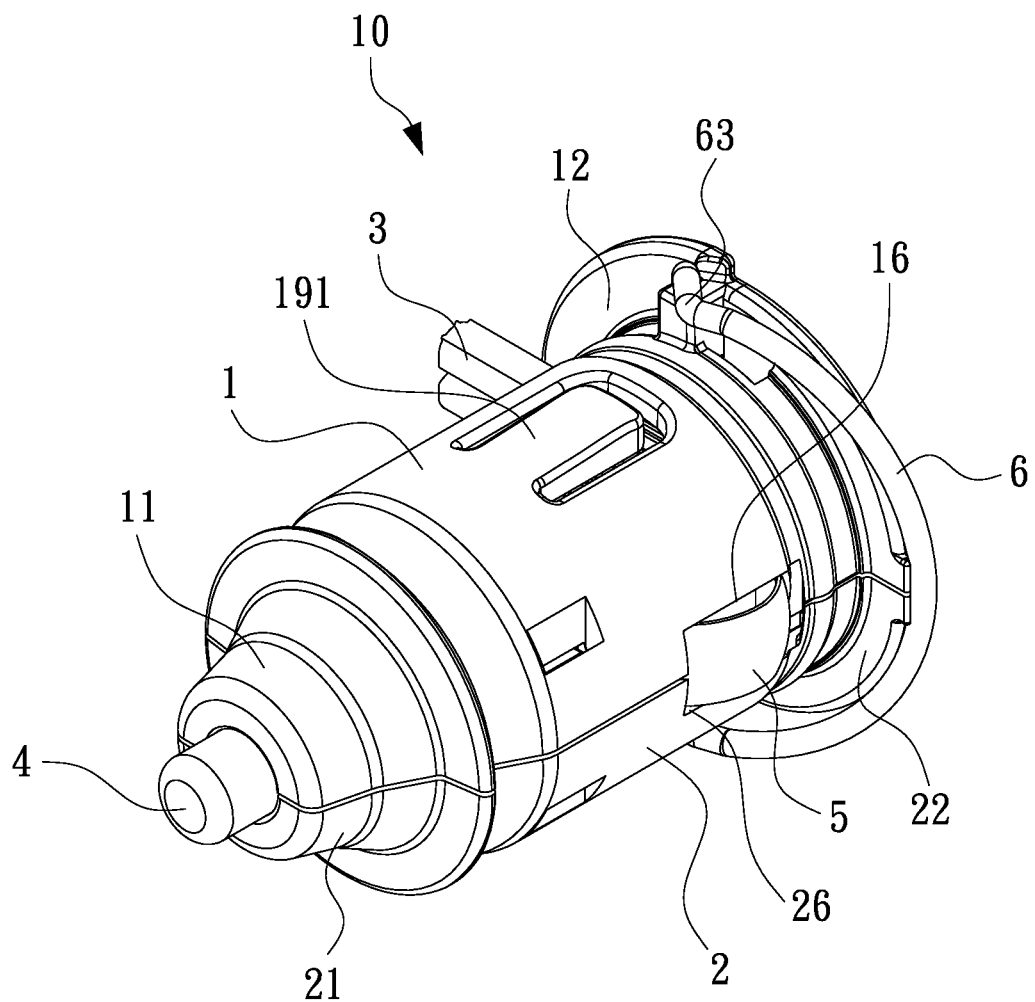
FIG. 4 is a perspective view showing the assembly of the cigarette lighter plug of the automobile tire repairing device according to the preferred embodiment of the present invention.
Figure 5:
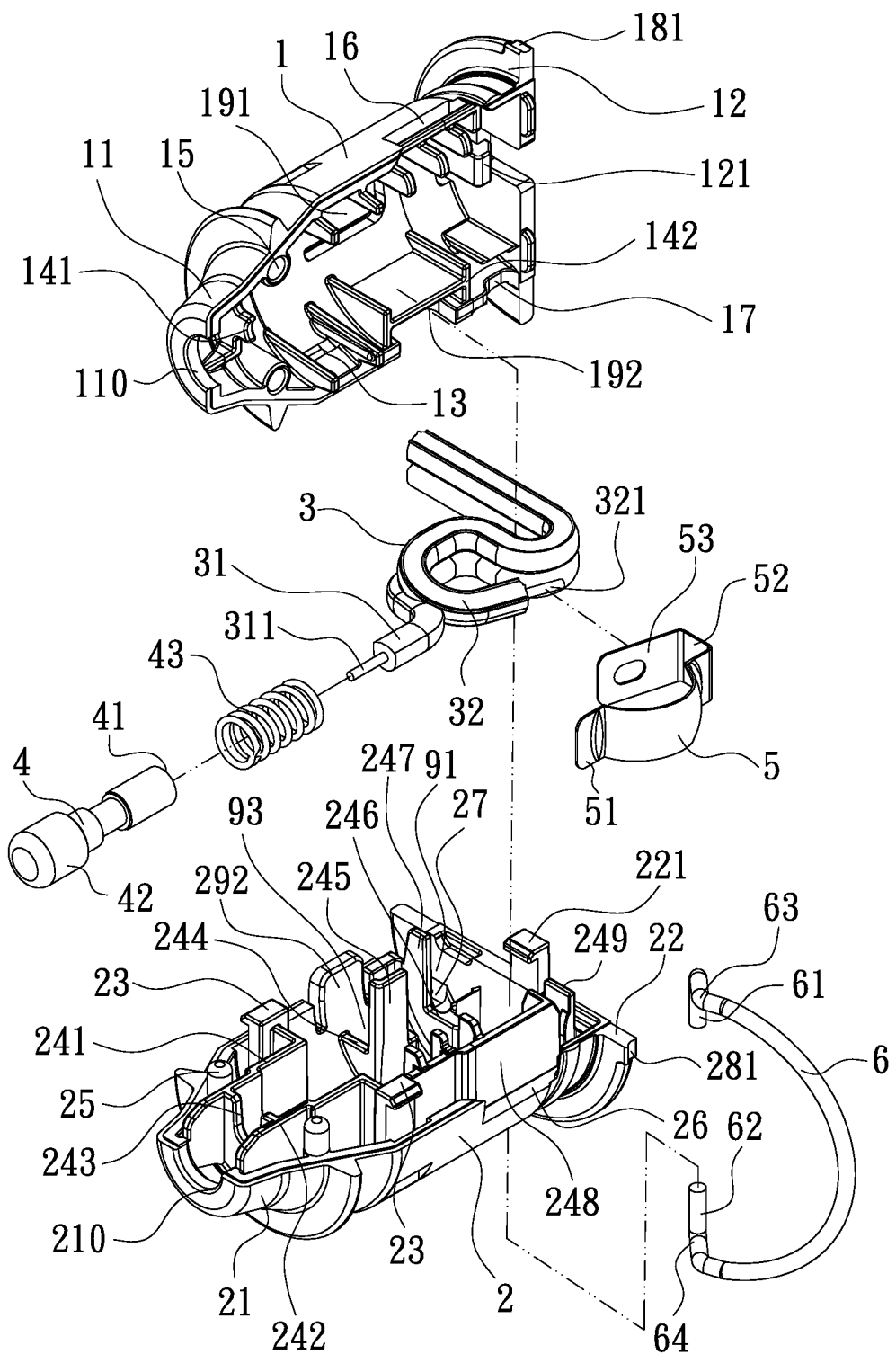
FIG. 5 is a perspective view showing the exploded components of the cigarette lighter plug of the automobile tire repairing device according to the preferred embodiment of the present invention.
Figure 6:
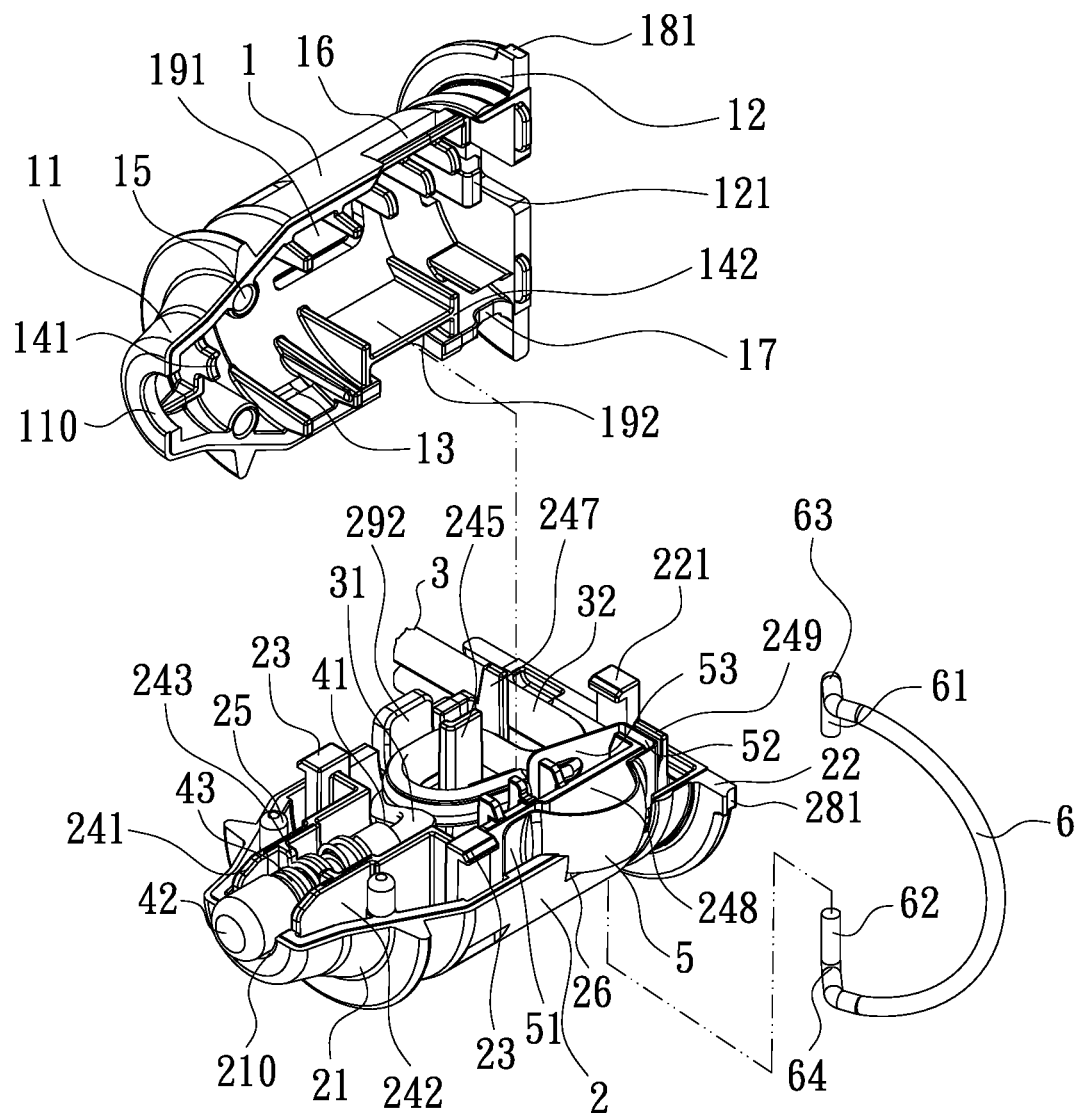
FIG. 6 is a perspective view showing the exploded components of a part of the cigarette lighter plug of the automobile tire repairing device according to the preferred embodiment of the present invention.

Referring to FIG. 4, the positive-electrode conductive stem 4, the spring 43, and the semi-arch flexible element 5 are received among the multiple second partitions of the second housing 2, the head 42 of the positive-electrode conductive stem 4 extends and is exposed outside the second semicircular orifice 210 of the second extension 21 of the second housing 2, the spring 43 of the positive-electrode conductive stem 4 is engaged on the arched sheet 243 between the first L-shaped sheet 241 and the second L-shaped sheet 242 of the second housing 2, and the semi-arch flexible element 5 extends out of the first cutout 26 of the second housing 2.

Figure 1:
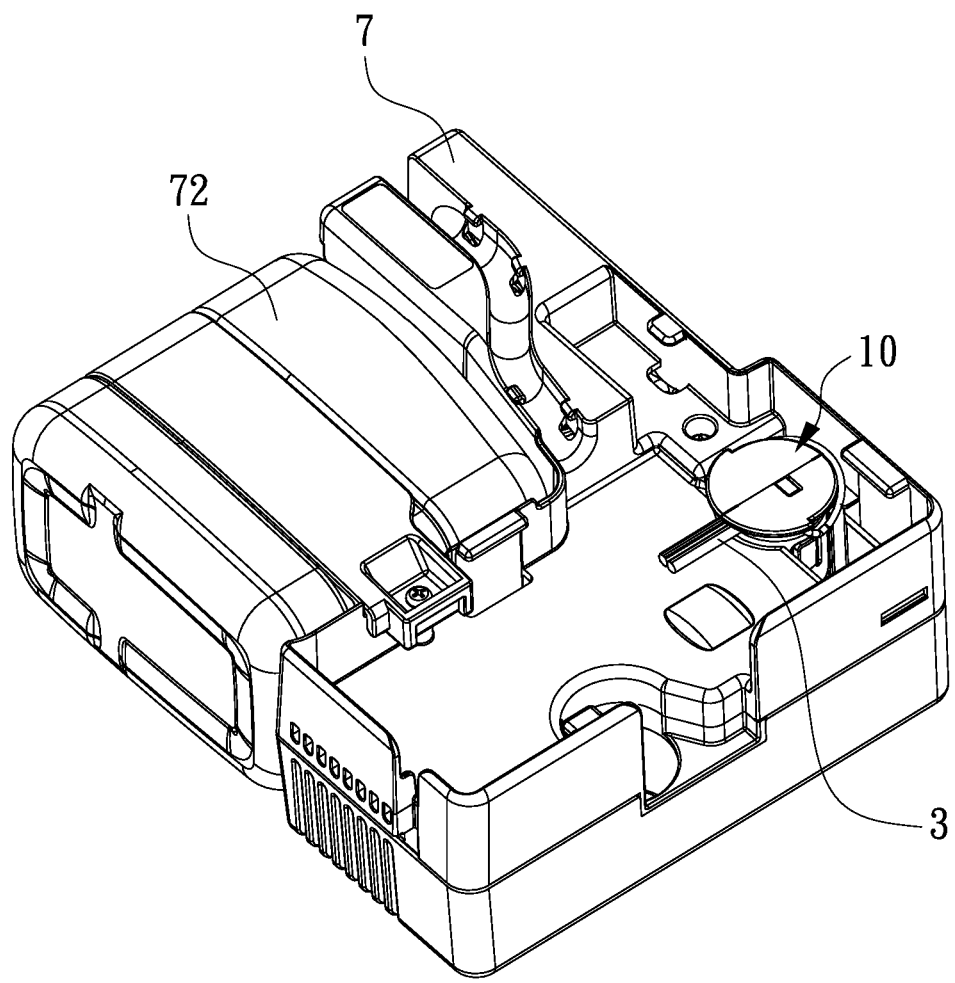
FIG. 1 is a perspective view showing the assembly of a cigarette lighter plug of an automobile tire repairing device being stored in a box according to a preferred embodiment of the present invention.
Figure 2:
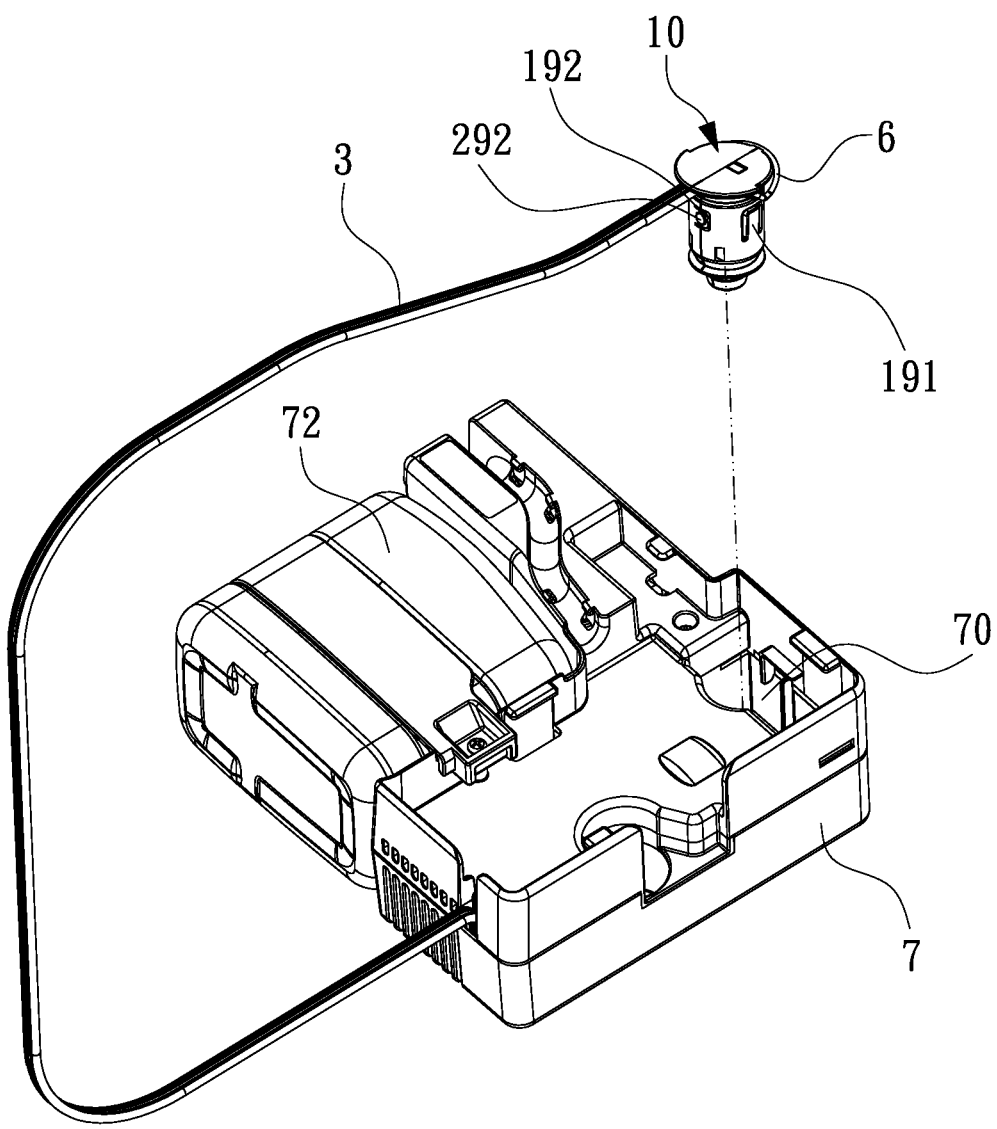
FIG. 2 is a perspective view showing the assembly of the cigarette lighter plug of the automobile tire repairing device being removed from a box according to the preferred embodiment of the present invention.
Figure 3:
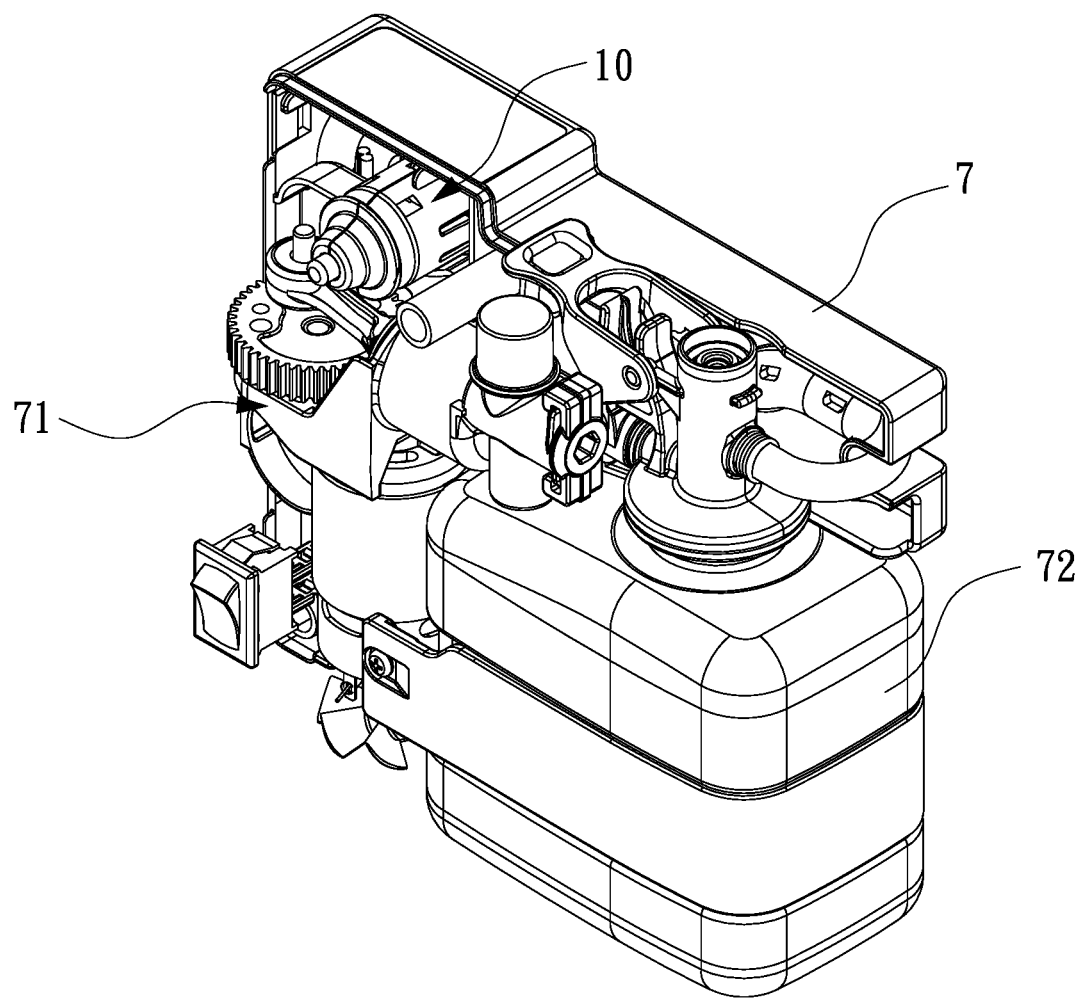
FIG. 3 is another perspective view showing the assembly of the cigarette lighter plug of the automobile tire repairing device being stored in the box according to the preferred embodiment of the present invention.

The first housing 1 is connected with the second housing 2 which is fixed with the positive-electrode conductive stem 4, the spring 43 and the semi-arch flexible element 5, the at least one positioning orifice 15 of the first housing 1 corresponds to the at least one bolt 25 of the second housing 2, the two locking orifices 13 of the first housing 1 is engaged with the two lock tabs 23 of the second housing 2, and the first retainer 121 of the first housing 1 is retained with the second retainer 221 so that the first housing 1 is connected with the second housing 2 securely, the first contact sheet 141 of the first housing 1 contacts with the positive-electrode conductive stem 4 on the arched sheet 243 of the second housing 2, and the second contact sheet 142 of the first housing 1 presses the power cord 3 on the first support sheet 244 of the second housing 2, thus connecting the cigarette lighter plug completely. As shown in FIG. 2, an end of the power cord 3 connected with the positive-electrode conductive stem 4, the spring 43, and the semi-arch flexible element 5 is extended out of the box 7 of the air compressor of the tire repairing device via the first notch 17 of the first housing 1 and the second notch 27 of the second housing 2.

Figure 9:
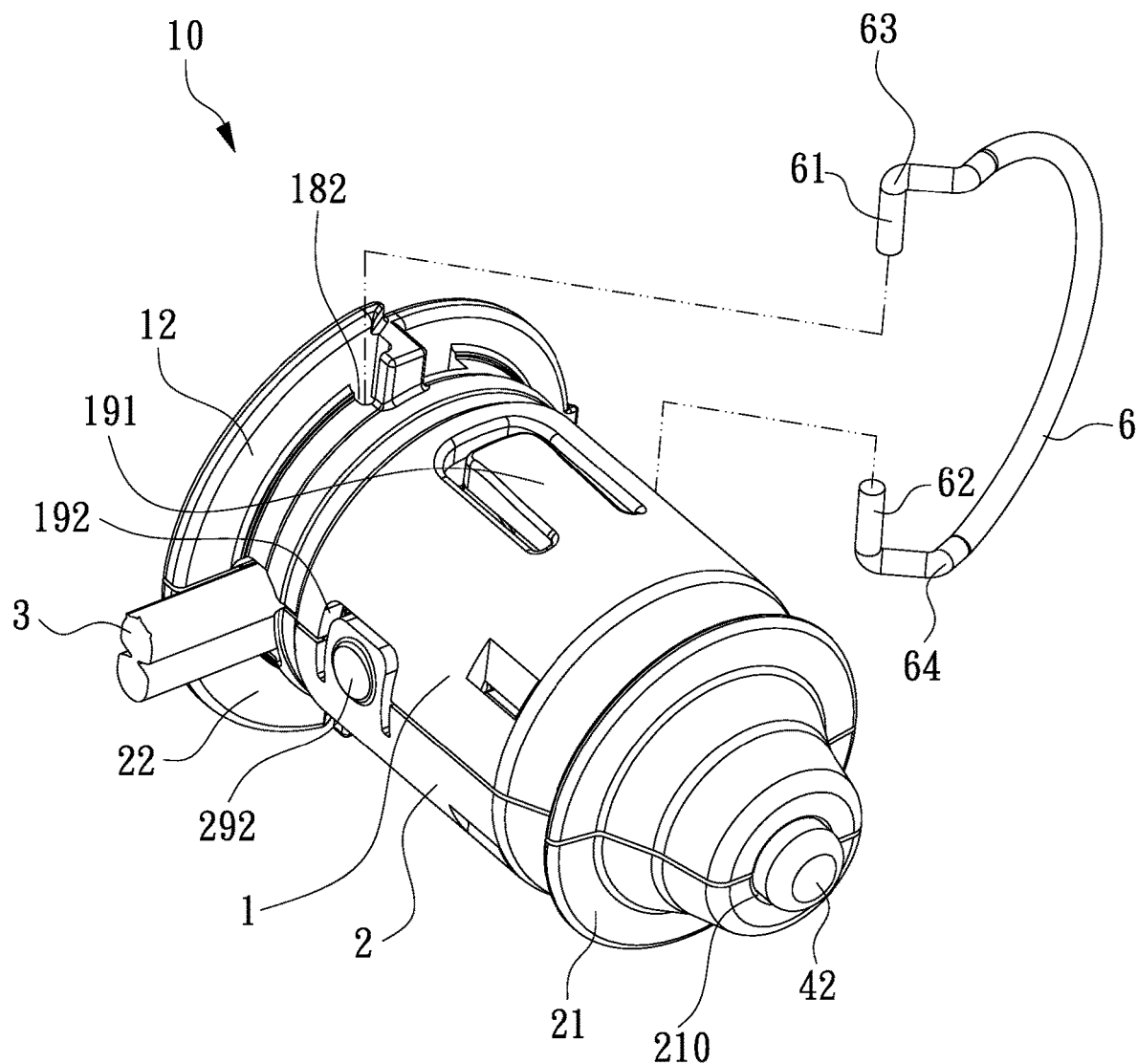
FIG. 9 is another perspective view showing the exploded components of a part of the cigarette lighter plug of the automobile tire repairing device according to the preferred embodiment of the present invention.

As illustrated in FIGS. 9 and 10, the first housing 1 further includes a first through orifice 182 adjacent to the end seat 12, and the second housing 2 further includes a second through orifice 182 proximate to the holder 22, wherein a structure of the second through orifice 282 of the second housing 2 corresponds to a structure of the first through orifice 182 of the first housing 1. The cigarette lighter plug comprises a pull ring 6, and the pull ring 6 includes a first pulling portion 61 formed on a first end thereof and inserted to the first through orifice 182, the first pulling portion 62 formed on a second end of the pull ring 6 and inserted to the second through orifice 282 of the second housing 2, wherein the pull ring 6 is engaged with a first trough 181 of the end seat 12 of the first housing 1 and a second trough 281 of the holder 22 of the second housing 2, and the pull ring 6 further includes a first bend section 63 formed on a connection portion of the first pulling portion 61 and the pull ring 6, a second bend section 64 formed on a connection portion of the second pulling portion 62 and the pull ring 6.

The first housing 1 further includes a first protrusion 191 extending from an outer wall thereof, a third cutout 192 defined opposite to the first cutout 16 of the first housing 1, and the second housing 2 further includes a second protrusion 291 extending from an outer wall thereof opposite to the first protrusion 191 of the first housing 1, and the wing 292 opposite to the first cutout 26 of the second housing 2. When the first housing 1 is connected with the second housing 2, the third cutout 192 of the first housing 1 receives the wing 292 of the second housing 2, as shown in FIG. 11, the first protrusion 191 of the first housing 1 has a first contact A defined on a top thereof, and the second protrusion 291 of the second housing 2 has a second contact B defined on a top thereof, the wing 292 of the second housing 2 has a third contact P defined on a top thereof, and the semi-arch flexible element 5 has a fourth contact Q defined on a top thereof opposite to the wing 292, such that when the cigarette lighter plug 10 is inserted into or removed from the socket 8 of the vehicle, the first contact A, the second contact B, the third contact P, and the fourth contact Q of the cigarette lighter plug 10 abut against an inner wall of the socket 8.

Figure 7:
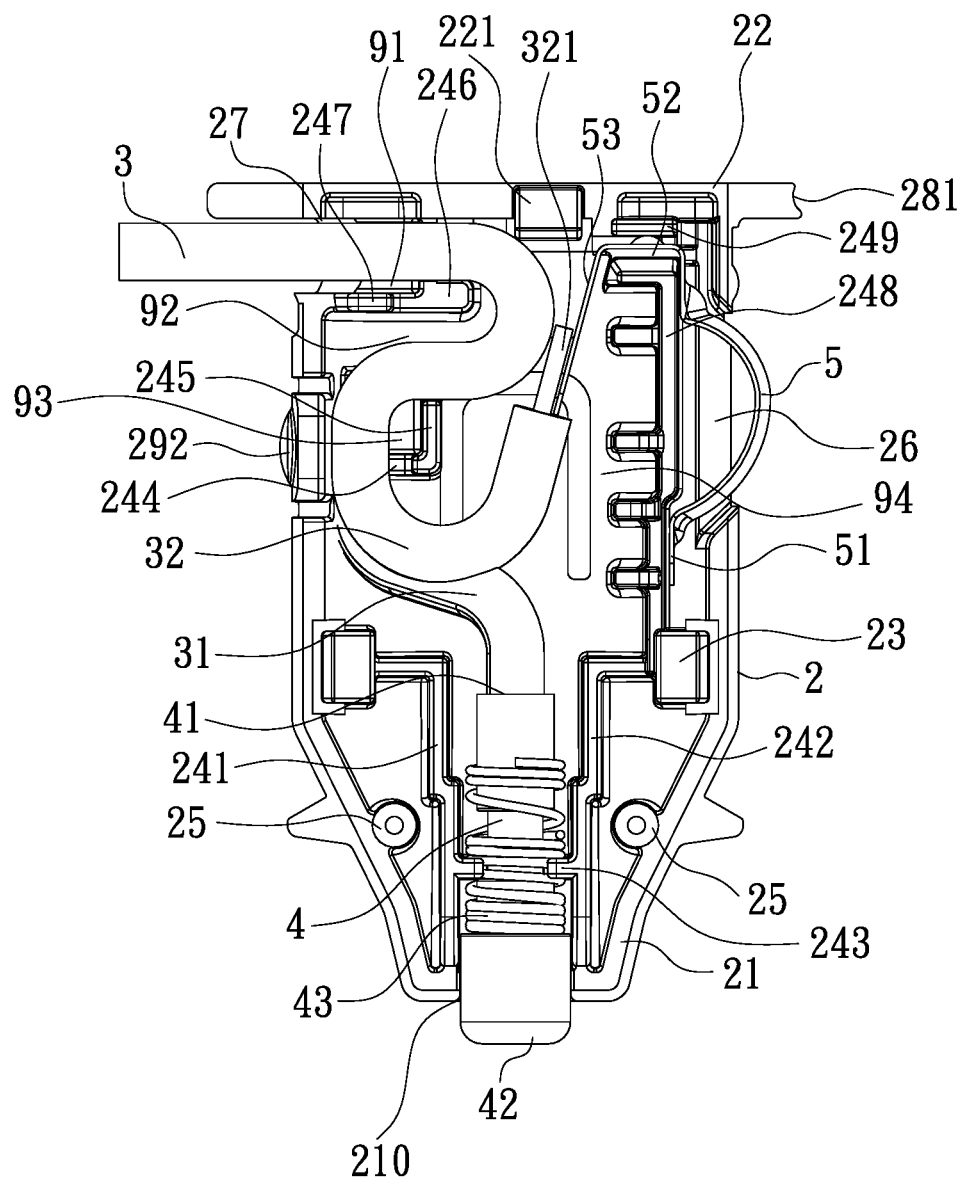
FIG. 7 is a side plan view showing the assembly of a part of the cigarette lighter plug of the automobile tire repairing device according to the preferred embodiment of the present invention.
Figure 8:
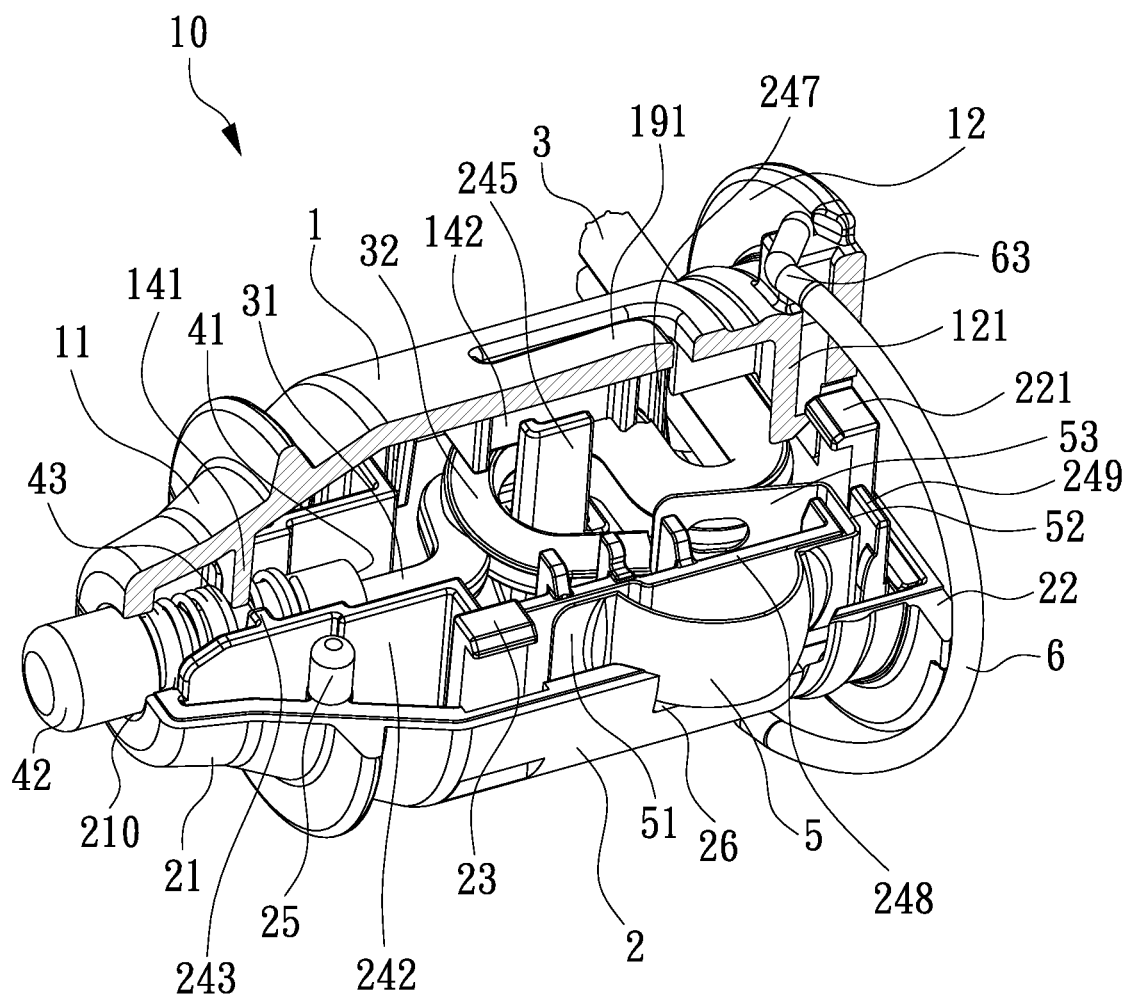
FIG. 8 is a cross-sectional perspective view showing the assembly of a part of the cigarette lighter plug of the automobile tire repairing device according to the preferred embodiment of the present invention.
Figure 13:
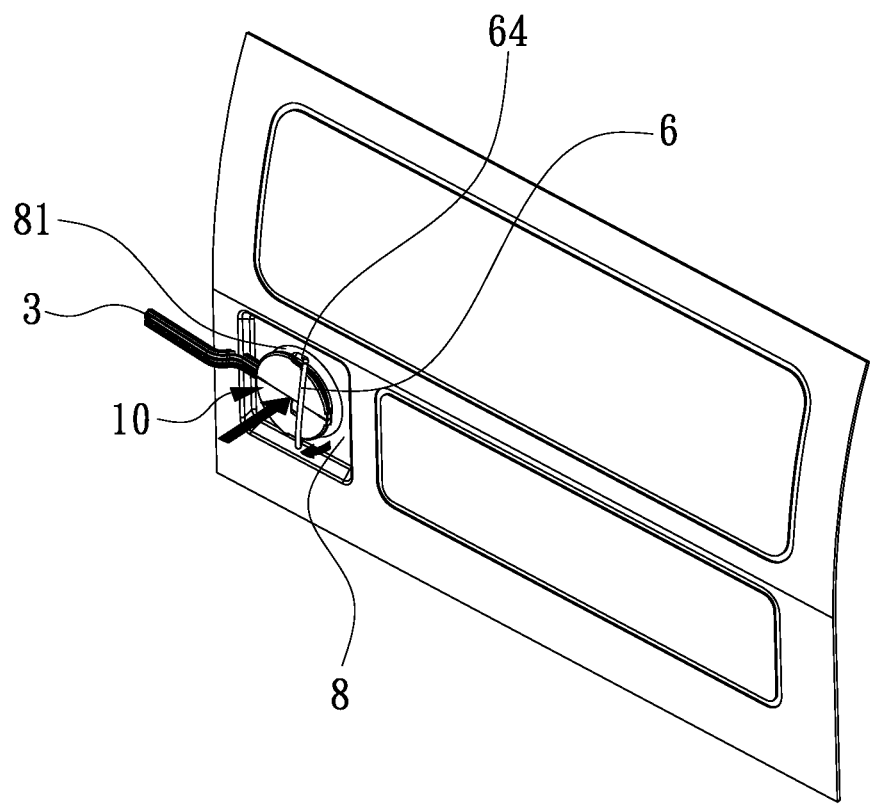
FIG. 13 is another perspective view showing the application of the cigarette lighter plug of the automobile tire repairing device according to the preferred embodiment of the present invention.
Figure 14:
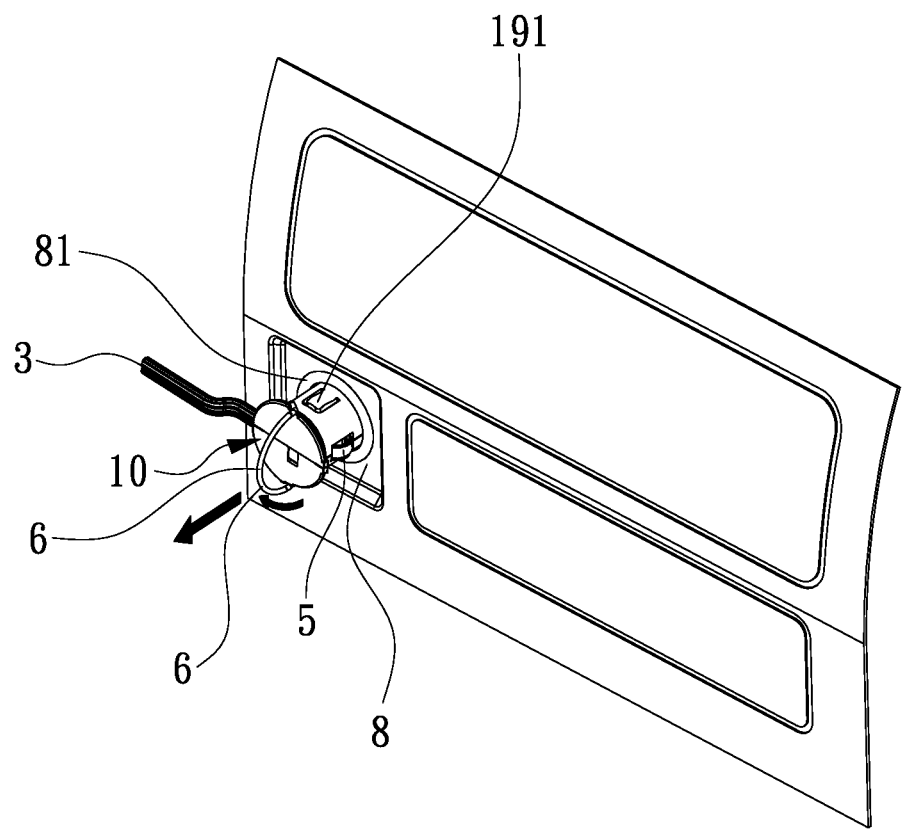
FIG. 14 is also another perspective view showing the application of the cigarette lighter plug of the automobile tire repairing device according to the preferred embodiment of the present invention.

With reference to FIGS. 12 and 13, when the cigarette lighter plug 10 is inserted into or removed from the socket 8 of the vehicle, the semi-arch flexible element 5 is pressed, the L-shaped sheet 52 of the semi-arch flexible element 5 is engaged between the third L-shaped sheet 248 and the extending sheet 249 of the second housing 2, the flank 51 of the semi-arch flexible element 5 abuts against the third L-shaped sheet 248 so that the flank 51 and the conductive foot 53 do not move (also as shown in FIG. 7), and the semi-arch flexible element 5 is not removed. Referring to FIG. 10, a central point C is defined on a central axis of the first pulling portion 61 of the pull ring 6, and a distance D is defined between the central point C and a bending section 64. When the cigarette lighter plug 10 is inserted into the socket 8 (also as shown in FIG. 13), the pull ring 6 swings outward along the central point C, and the first bending section 63 and the second bending section 64 of the pull ring 6 are pushed to move outward by an external fence 81 of the socket 8, such that the pull ring 6 rotates at an angle outward. When the cigarette lighter plug 10 is removed from the socket 8, it urges the pull ring 6 to be moved outward, as illustrated in FIG. 14, the two locking orifices 13 of the first housing 1 are engaged with the two lock tabs 23 of the second housing 2, and the first retainer 121 of the first housing 1 is retained with the second retainer 221 (also shown in FIG. 6) so that the cigarette lighter plug 10 is removed from the socket 8, the first housing 1 and the second housing 2 are not forced to damage.

Accordingly, the cigarette lighter plug 10 of the automobile tire repairing device is in a small size so as to be stored in a receiving groove 70 of the box 7 of the air compressor easily. In addition, the power cord is not winded or is bent in the S shape so as to avoid the power cable being pulled to cause a removal or a poor contact. The cigarette lighter plug 10 includes the pull ring 6, when the cigarette lighter plug 10 is inserted into the socket 8, the first bending section 63 and the second bending section 64 of the pull ring 6 are abutted against by the external fence 81 of the socket 8, such that the pull ring 6 rotates at an angle outward. When the cigarette lighter plug 10 is removed from the socket 8, it urges the pull ring 6 to be pulled outward, wherein the two locking orifices 13 of the first housing 1 are engaged with the two lock tabs 23 of the second housing 2, and the first retainer 121 of the first housing 1 is retained with the second retainer 221 (also shown in FIG. 6) so that when the cigarette lighter plug 10 is removed from the socket 8, the first housing 1 and the second housing 2 are not forced to damage.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A cigarette lighter plug of an automobile tire repairing device, the tire repairing device comprising:
   a box in which an air pump is received, and the cigarette lighter plug being inserted into a power supply so as to receive electricity; wherein the cigarette lighter plug includes a first housing, a second housing, and a power cord;

wherein the power cord includes a positive-electrode power part and a negative-electrode power part, the second housing includes a post extending adjacent to a holder, a first accommodation chamber defined between the holder of the second housing and the post, a column proximate to the post, a second accommodation chamber defined between the column and the post, a semi-arch flexible element received on a side of the second housing, the second housing further includes a wing extending therefrom opposite to the semi-arch flexible element, a third accommodation chamber defined between the wing and the column, and a fourth accommodation chamber defined between a conductive foot of the semi-arch flexible element and the column so as to receive the power cord, wherein the first housing is engaged with the second housing, and the power cord is not winded or is bent in an S shape.

2. The cigarette lighter plug as claimed in claim 1, wherein the first housing further includes a first through orifice adjacent to an end seat, and the second housing further includes a second through orifice proximate to the holder, wherein the cigarette lighter plug comprises a pull ring, and the pull ring includes a first pulling portion formed on a first end thereof and inserted to the first through orifice, a first pulling portion formed on a second end of the pull ring and inserted to the second through orifice of the second housing, wherein the pull ring is engaged with a first trough of the end seat of the first housing and a second trough of the holder of the second housing, and the pull ring further includes a first bend section formed on a connection portion of the first pulling portion and the pull ring, a second bend section formed on a connection portion of the second pulling portion and the pull ring, wherein a central point is defined on a central axis of the first pulling portion of the pull ring, and a distance is defined between the central point and a bending section.

3. The cigarette lighter plug as claimed in claim 1, wherein the first housing is semi-cylindrical and includes a first extension and an end seat, the first extension has a first semicircular orifice defined thereon, and the end seat has a first retainer, the first housing includes two locking orifices formed on an inner wall thereof adjacent to the first extension, multiple first partitions formed on the inner wall of the first housing, and at least one positioning orifice formed on the inner wall of the first housing; the multiple first partitions have a first contact sheet and a second contact sheet, the first housing includes a first cutout adjacent to the end seat, and the first housing further includes a first notch connected with the end seat;

wherein the second housing is semi-cylindrical and includes a second extension and a holder, the second extension has a second semicircular orifice defined thereon and corresponding to the first semicircular orifice of the first housing, and the holder has a second retainer, the second housing further includes two lock tabs extending from an inner wall thereof and corresponding to the two locking orifices of the first housing, multiple second partitions formed on the inner wall of the second housing, at least one bolt corresponding to the at least one positioning orifice of the first housing.

4. The cigarette lighter plug as claimed in claim 3, wherein the multiple second partitions of the second housing have a first L-shaped sheet, a second L-shaped sheet, an arched sheet, a first support sheet, a column, a second support sheet, a post, a third L-shaped sheet, and an extending sheet;

wherein the first L-shaped sheet is spaced from the second L-shaped sheet oppositely, the two lock tabs are connected with two short segments of the first L-shaped sheet and the second L-shaped sheet, and the second semicircular orifice is connected with two long segments of the first L-shaped sheet and the second L-shaped sheet, wherein the arched sheet is defined between the first L-shaped sheet and the second L-shaped sheet, the first support sheet extends from the inner wall of the second housing and is defined between the first L-shaped sheet and the holder of the second housing, the column extends upward from the first support sheet proximate to a center of the second housing, and the second support sheet is formed on the inner wall of the second housing and is defined between the first support sheet and the holder of the second housing, the post extends upward between the second support sheet and the holder of the second housing, the first accommodation chamber is defined between the holder of the second housing and the post, and the second accommodation chamber is defined between the column and the post, the third L-shaped sheet extends from the inner wall of the second housing opposite to the first support sheet, and the extending sheet extends upward from the third L-shaped sheet and the holder of the second housing; the second housing further includes a second cutout defined adjacent to the holder, and the wing extends from the second housing opposite to the first cutout; the third accommodation chamber is defined between the wing and the column, and the fourth accommodation chamber is defined between the third L-shaped sheet and the column, wherein the second housing includes a second notch connected with the holder and defined between the post and the holder of the second housing;

wherein the power cord is fixed on the second support sheet from the second notch of the second housing via the first accommodation chamber, and the power cord is further inserted through the second accommodation chamber and the third accommodation chamber to be positioned on the first support sheet, then the power cord is inserted into the fourth accommodation chamber from the first support sheet, wherein the power cord includes the positive-electrode power part and the negative-electrode power part which are not winded or are bent in an S shape, the positive-electrode power part has a positive-electrode pin, and the negative-electrode power part has a negative-electrode pin.

5. The cigarette lighter plug as claimed in claim 4, wherein the cigarette lighter plug of the automobile tire repairing device is in a small size so as to be stored in a receiving groove of the box of the air compressor;

wherein the cigarette lighter plug further comprises a positive-electrode conductive stem, and the positive-electrode conductive stem includes an intermediate section and two external segments, wherein a diameter of the intermediate section is less than a diameter of the two external segments, the positive-electrode conductive stem further includes a fixing foot extending from a first end thereof, a head formed on a second end of the positive-electrode conductive stem, a spring fitted onto the positive-electrode conductive stem from the fixing foot and abuts against the spring; the positive-electrode pin of the positive-electrode power part contacts with the fixing foot of the positive-electrode conductive stem, the positive-electrode conductive stem is received between the first L-shaped sheet and the second L-shaped sheet of the second housing and is mounted on the arched sheet, wherein the positive-electrode power part is accommodated in the multiple second partitions of the second housing;

wherein the semi-arch flexible element is made of conductive material, the semi-arch flexible element includes a flank extending from a first end thereof, a L-shaped sheet extending from a second end of the semi-arch flexible element, and a conductive foot extending from a distal end of the L-shaped sheet, wherein the L-shaped sheet of the semi-arch flexible element is retained between the third L-shaped sheet and the extending sheet of the second housing, and the flank of the semi-arch flexible element abuts against the fourth accommodation chamber, wherein the negative-electrode pin of the negative-electrode power part of the power cord is connected with the conductive foot of the semi-arch flexible element, the negative-electrode power part of the power cord is received among the multiple second partitions, wherein the positive-electrode power part is welded with the positive-electrode conductive stem, and the negative-electrode power part is welded with the conductive foot of the semi-arch flexible element, wherein a length of the positive-electrode power part is equal to a length of the negative-electrode power part;

wherein the positive-electrode conductive stem, the spring, and the semi-arch flexible element are received among the multiple second partitions of the second housing, the head of the positive-electrode conductive stem extends and is exposed outside the second semi-circular orifice of the second extension of the second housing.

6. The cigarette lighter plug as claimed in claim 5, wherein the first housing is connected with the second housing which is fixed with the positive-electrode conductive stem, the spring and the semi-arch flexible element, the at least one positioning orifice of the first housing corresponds to the at least one bolt of the second housing, the two locking orifices of the first housing is engaged with the two lock tabs of the second housing, and the first retainer of the first housing is retained with the second retainer so that the first housing is connected with the second housing securely, the first contact sheet of the first housing contacts with the positive-electrode conductive stem on the arched sheet of the second housing, and the second contact sheet of the first housing presses the power cord on the first support sheet of the second housing.

7. The cigarette lighter plug as claimed in claim 5, wherein the first housing further includes a first protrusion extending from an outer wall thereof, a third cutout defined opposite to the first cutout of the first housing, and the second housing further includes a second protrusion extending from an outer wall thereof opposite to the first protrusion of the first housing, and the wing extending opposite to the first cutout of the second housing; when the first housing is connected with the second housing, the third cutout of the first housing receives the wing of the second housing, the first protrusion of the first housing includes a first contact defined on a top thereof, and the second protrusion of the second housing has a second contact defined on a top thereof, the wing of the second housing has a third contact defined on a top thereof, and the semi-arch flexible element has a fourth contact defined on a top thereof opposite to the wing, such that when the cigarette lighter plug is inserted into or removed from the socket of the vehicle, the first contact, the second contact, the third contact, and the fourth contact of the cigarette lighter plug abut against an inner wall of the socket.

8. A cigarette lighter plug of an automobile tire repairing device, the tire repairing device comprising:
a box, an air pump received in the box, and a sealant supply can connected with the air pump, the cigarette lighter plug being inserted into a power supply so as to receive electricity; wherein the cigarette lighter plug includes a first housing, a second housing, and a power cord;

wherein the power cord includes a positive-electrode power part and a negative-electrode power part, the second housing includes a post extending adjacent to a holder, a first accommodation chamber defined between the holder of the second housing and the post, a column proximate to the post, a second accommodation chamber defined between the column and the post, a semi-arch flexible element received on a side of the second housing, the second housing further includes a wing extending therefrom opposite to the semi-arch flexible element, a third accommodation chamber defined between the wing and the column, and a fourth accommodation chamber defined between a conductive foot of the semi-arch flexible element and the column so as to receive the power cord, wherein the first housing is engaged with the second housing, and the power cord is not winded or is bent in an S shape.

* * * * *